US010561982B2

(12) United States Patent
Luo et al.

(10) Patent No.: US 10,561,982 B2
(45) Date of Patent: Feb. 18, 2020

(54) AMMONIA-BASED DESULFURIZATION PROCESS AND APPARATUS

(71) Applicant: Jiangnan Environmental Protection Group Inc., Grand Cayman (KY)

(72) Inventors: Jing Luo, NanJing (CN); Changxiang Xu, NanJing (CN); Xiangjun Xu, NanJing (CN); Yongying Luo, NanJing (CN)

(73) Assignee: Jiangnan Environmental Protection Group Inc., Grand Cayman OT (KY)

( * ) Notice: Subject to any disclaimer, the term of this patent is extended or adjusted under 35 U.S.C. 154(b) by 0 days.

(21) Appl. No.: 16/522,899

(22) Filed: Jul. 26, 2019

(65) Prior Publication Data

US 2019/0344216 A1    Nov. 14, 2019

Related U.S. Application Data

(63) Continuation of application No. 16/357,831, filed on Mar. 19, 2019, now Pat. No. 10,399,033, which is a (Continued)

(30) Foreign Application Priority Data

May 25, 2017    (CN) .......................... 2017 1 0379460

(51) Int. Cl.
*B01D 53/50* (2006.01)
*B01D 53/78* (2006.01)

(52) U.S. Cl.
CPC ......... *B01D 53/507* (2013.01); *B01D 53/504* (2013.01); *B01D 53/78* (2013.01);
(Continued)

(58) Field of Classification Search
CPC .. B01D 53/1481; B01D 53/50; B01D 53/501; B01D 53/504; B01D 53/78;
(Continued)

(56) References Cited

U.S. PATENT DOCUMENTS 2,810,627 A    10/1957  Johnstone et al.
3,510,253 A *  5/1970   Petersen ................ B01D 53/50
                                                423/243.06
(Continued)

FOREIGN PATENT DOCUMENTS

CL    201600812    4/2016
CL    201602018    8/2016
(Continued)

OTHER PUBLICATIONS

Intellectual Property Office of the Philippines Search Report, dated Oct. 22, 2018.
(Continued)

*Primary Examiner* — Timothy C Vanoy
(74) *Attorney, Agent, or Firm* — Weiss & Arons LLP

(57) ABSTRACT

Apparatus and methods for desulfurization of a sulfur-oxide containing gas by treatment with ammonia containing liquids. The apparatus and methods may utilize two distinct circuits of two different ammonia containing liquids which are applied in two distinct chambers. The gas may be cooled prior to entry into the circuits. There may be fluid communication between the two circulation circuits.

30 Claims, 3 Drawing Sheets

Related U.S. Application Data continuation of application No. 16/188,816, filed on Nov. 13, 2018, now Pat. No. 10,413,865, which is a continuation of application No. 16/018,386, filed on Jun. 26, 2018, now Pat. No. 10,406,478, which is a continuation of application No. 15/619,122, filed on Jun. 9, 2017, now Pat. No. 10,016,721.

(52) U.S. Cl.
CPC .... *B01D 2251/11* (2013.01); *B01D 2252/102* (2013.01); *B01D 2258/0283* (2013.01); *Y02A 50/2346* (2018.01)

(58) Field of Classification Search
CPC .... B01D 2251/2062; B01D 2251/2065; B01D 2252/102; B01D 2257/302; B01D 2258/0283; B01J 10/00; B01J 19/00; B01J 19/24; B01J 2204/00; B01J 2219/00
See application file for complete search history.

(56) References Cited

U.S. PATENT DOCUMENTS

| | | | |
|---|---|---|---|
| 3,645,671 | A | 2/1972 | Griffin, Jr. et al. |
| 3,752,877 | A | 8/1973 | Beavon |
| 3,983,217 | A | 9/1976 | Muraki et al. |
| 4,250,160 | A | 2/1981 | Eakman |
| 4,294,590 | A | 10/1981 | Linde et al. |
| 4,324,776 | A | 4/1982 | Kim |
| 4,378,977 | A | 4/1983 | Linde et al. |
| 4,552,747 | A | 11/1985 | Goar |
| 4,690,807 | A | 9/1987 | Saleem |
| 4,865,817 | A | 9/1989 | Burgess et al. |
| 5,019,361 | A | 5/1991 | Hakka |
| 5,106,607 | A | 4/1992 | Chopin et al. |
| 5,362,458 | A | 11/1994 | Saleem et al. |
| 5,632,967 | A | 5/1997 | Nasato |
| 6,063,352 | A | 5/2000 | Risse et al. |
| 6,066,304 | A | 5/2000 | Freetly et al. |
| 6,139,807 | A | 10/2000 | Risse et al. |
| 6,221,325 | B1 | 4/2001 | Brown et al. |
| 6,277,343 | B1 | 8/2001 | Gansley et al. |
| 6,444,185 | B1 | 9/2002 | Nougayrede et al. |
| 6,508,998 | B1 | 1/2003 | Nasato |
| 6,569,398 | B2 | 5/2003 | Fenderson |
| 6,616,908 | B2 | 9/2003 | Watson et al. |
| 6,776,974 | B1 | 8/2004 | Burmaster et al. |
| 6,991,771 | B2 | 1/2006 | Duncan et al. |
| 7,351,392 | B2 | 4/2008 | Chen et al. |
| 7,635,408 | B2 | 12/2009 | Mak et al. |
| 7,648,692 | B2 | 1/2010 | Chow et al. |
| 7,754,471 | B2 | 7/2010 | Chen et al. |
| 7,879,135 | B2 | 2/2011 | Ravikumar et al. |
| 7,910,077 | B2 | 3/2011 | Chow et al. |
| 8,178,070 | B2 | 5/2012 | Wong et al. |
| 8,206,669 | B2 | 6/2012 | Schaffer et al. |
| 8,337,790 | B2 | 12/2012 | Welp et al. |
| 8,361,432 | B2 | 1/2013 | Parekh et al. |
| 8,444,943 | B2 | 5/2013 | Lamar |
| 8,545,793 | B2 | 10/2013 | Thielert |
| 8,865,098 | B2 | 10/2014 | Suchak |
| 8,871,176 | B2 | 10/2014 | Liu et al. |
| 9,370,745 | B2 | 6/2016 | Xu et al. |
| 10,016,721 | B1 * | 7/2018 | Luo ........................ B01D 53/78 |
| 10,399,033 | B2 * | 9/2019 | Luo |
| 10,406,478 | B2 * | 9/2019 | Luo ..................... B01D 53/507 |
| 2003/0175190 | A1 | 9/2003 | Duncan et al. |
| 2007/0248518 | A1 | 10/2007 | Jung et al. |
| 2008/0267847 | A1 | 10/2008 | Gal |
| 2009/0004070 | A1 | 1/2009 | Chow et al. |
| 2010/0221162 | A1 * | 9/2010 | Welp ................... B01D 53/501 |
| | | | 423/220 |
| 2011/0195008 | A1 | 8/2011 | Menzel et al. |
| 2011/0243822 | A1 | 10/2011 | Mortson |
| 2015/0352489 | A1 | 12/2015 | Luo et al. |

FOREIGN PATENT DOCUMENTS

| | | |
|---|---|---|
| CL | 201701699 | 6/2017 |
| CN | 1211464 | 3/1999 |
| CN | 1280032 A | 1/2001 |
| CN | 201880482 U | 6/2001 |
| CN | 1377722 A | 11/2002 |
| CN | 1178735 C | 4/2003 |
| CN | 1408464 A | 4/2003 |
| CN | 1164480 C | 9/2004 |
| CN | 2640584 Y | 9/2004 |
| CN | 2640585 Y | 9/2004 |
| CN | 2668235 Y | 1/2005 |
| CN | 1617831 A | 5/2005 |
| CN | 2746971 Y | 12/2005 |
| CN | 2746972 Y | 12/2005 |
| CN | 2746973 Y | 12/2005 |
| CN | 2754711 Y | 2/2006 |
| CN | 1251965 C | 4/2006 |
| CN | 2772609 Y | 4/2006 |
| CN | 2778373 Y | 5/2006 |
| CN | 2799059 Y | 7/2006 |
| CN | 2799060 Y | 7/2006 |
| CN | 1850733 A | 10/2006 |
| CN | 1283346 C | 11/2006 |
| CN | 1887408 | 1/2007 |
| CN | 1887409 A | 1/2007 |
| CN | 1321723 C | 6/2007 |
| CN | 101085410 A | 12/2007 |
| CN | 201030298 Y | 3/2008 |
| CN | 201052456 Y | 4/2008 |
| CN | 100395006 C | 6/2008 |
| CN | 201109711 Y | 9/2008 |
| CN | 100428979 C | 10/2008 |
| CN | 201129965 Y | 10/2008 |
| CN | 201132102 Y | 10/2008 |
| CN | 101352642 A | 1/2009 |
| CN | 201179415 Y | 1/2009 |
| CN | 100460045 C | 2/2009 |
| CN | 100475313 C | 4/2009 |
| CN | 101422693 A | 5/2009 |
| CN | 201231130 Y | 5/2009 |
| CN | 101524620 | 9/2009 |
| CN | 201320447 Y | 10/2009 |
| CN | 201333376 Y | 10/2009 |
| CN | 101575103 A | 11/2009 |
| CN | 101585511 A | 11/2009 |
| CN | 201380037 Y | 1/2010 |
| CN | 201380038 Y | 1/2010 |
| CN | 201380039 Y | 1/2010 |
| CN | 201380040 Y | 1/2010 |
| CN | 100588608 C | 2/2010 |
| CN | 101642629 A | 2/2010 |
| CN | 201423237 Y | 3/2010 |
| CN | 101274750 B | 6/2010 |
| CN | 101745303 A | 6/2010 |
| CN | 201492952 U | 6/2010 |
| CN | 201529487 U | 7/2010 |
| CN | 201529488 U | 7/2010 |
| CN | 201537456 U | 8/2010 |
| CN | 101274196 B | 12/2010 |
| CN | 201669043 U | 12/2010 |
| CN | 101182926 B | 1/2011 |
| CN | 101519192 B | 2/2011 |
| CN | 101579600 B | 4/2011 |
| CN | 102000490 A | 4/2011 |
| CN | 102012034 A | 4/2011 |
| CN | 101456541 B | 5/2011 |
| CN | 101576261 B | 5/2011 |
| CN | 101579602 B | 5/2011 |
| CN | 102061206 A | 5/2011 |
| CN | 101274204 B | 6/2011 |
| CN | 101670231 B | 8/2011 |
| CN | 201912884 U | 8/2011 |
| CN | 201912885 U | 8/2011 |
| CN | 201944861 U | 8/2011 |
| CN | 201949808 U | 8/2011 |
| CN | 201969488 U | 9/2011 |
| CN | 102205202 A | 10/2011 |

(56) References Cited

FOREIGN PATENT DOCUMENTS

| | | |
|---|---|---|
| CN | 102380305 A | 3/2012 |
| CN | 102381685 A | 3/2012 |
| CN | 102381686 A | 3/2012 |
| CN | 102423597 A | 4/2012 |
| CN | 101791517 B | 5/2012 |
| CN | 102451604 A | 5/2012 |
| CN | 202237765 U | 5/2012 |
| CN | 101456540 B | 7/2012 |
| CN | 101574614 B | 7/2012 |
| CN | 101637685 B | 7/2012 |
| CN | 102631827 A | 8/2012 |
| CN | 202460375 U | 10/2012 |
| CN | 202460420 U | 10/2012 |
| CN | 202460438 U | 10/2012 |
| CN | 101530727 B | 11/2012 |
| CN | 101955828 B | 11/2012 |
| CN | 102211762 B | 11/2012 |
| CN | 101972592 B | 12/2012 |
| CN | 202538627 U | 12/2012 |
| CN | 101934191 B | 1/2013 |
| CN | 102049186 B | 1/2013 |
| CN | 202725003 U | 2/2013 |
| CN | 202751942 U | 2/2013 |
| CN | 202754802 U | 2/2013 |
| CN | 202829575 U | 3/2013 |
| CN | 101418246 B | 4/2013 |
| CN | 202912691 U | 5/2013 |
| CN | 202924730 U | 5/2013 |
| CN | 202953829 U | 5/2013 |
| CN | 202962224 U | 6/2013 |
| CN | 103223292 A * | 7/2013 ............ B01D 53/78 |
| CN | 102381687 B | 8/2013 |
| CN | 203159221 U | 8/2013 |
| CN | 203264545 U | 11/2013 |
| CN | 203291675 U | 11/2013 |
| CN | 20329558 U | 12/2013 |
| CN | 102489140 B | 12/2013 |
| CN | 103418223 A * | 12/2013 ............ B01D 53/78 |
| CN | 103418223 A | 12/2013 |
| CN | 203612955 U | 5/2014 |
| CN | 102942162 B | 8/2014 |
| CN | 203781842 U | 8/2014 |
| CN | 102910593 B | 9/2014 |
| CN | 102847431 B | 10/2014 |
| CN | 103204477 B | 10/2014 |
| CN | 103446859 B | 10/2014 |
| CN | 104138713 A | 11/2014 |
| CN | 103301732 B | 1/2015 |
| CN | 103041679 B | 2/2015 |
| CN | 103301736 B | 2/2015 |
| CN | 104368231 A | 2/2015 |
| CN | 204134465 U | 2/2015 |
| CN | 204151066 U | 2/2015 |
| CN | 102895870 B | 3/2015 |
| CN | 102923670 B | 3/2015 |
| CN | 204198421 U | 3/2015 |
| CN | 103223292 B | 4/2015 |
| CN | 104555939 A | 4/2015 |
| CN | 204233957 U | 4/2015 |
| CN | 103112831 B | 5/2015 |
| CN | 204352660 U | 5/2015 |
| CN | 103301705 B | 8/2015 |
| CN | 103482583 B | 9/2015 |
| CN | 104923046 A | 9/2015 |
| CN | 104927894 A | 9/2015 |
| CN | 104941423 A | 9/2015 |
| CN | 104946296 A | 9/2015 |
| CN | 103463949 B | 12/2015 |
| CN | 105110819 A | 12/2015 |
| CN | 105126573 A | 12/2015 |
| CN | 105148712 A | 12/2015 |
| CN | 104353258 B | 1/2016 |
| CN | 104249995 B | 4/2016 |
| CN | 205235588 U | 5/2016 |
| CN | 205245200 U | 5/2016 |
| CN | 205252720 U | 5/2016 |
| CN | 205252721 U | 5/2016 |
| CN | 205252722 U | 5/2016 |
| CN | 205262780 U | 5/2016 |
| CN | 103822217 B | 6/2016 |
| CN | 105757688 A | 7/2016 |
| CN | 104555940 B | 8/2016 |
| CN | 105841168 A | 8/2016 |
| CN | 104524948 B | 9/2016 |
| CN | 205549846 U | 9/2016 |
| CN | 205562498 U | 9/2016 |
| CN | 103521060 B | 1/2017 |
| CN | 103939918 B | 1/2017 |
| CN | 104208992 B | 2/2017 |
| CN | 104258713 B | 2/2017 |
| CN | 104528659 B | 4/2017 |
| DE | 3733319 A1 | 9/1989 |
| EP | 165609 B1 | 6/1985 |
| EP | 212523 A2 | 3/1987 |
| JP | S47-043737 | 11/1972 |
| TW | 497985 | 8/2002 |
| WO | WO200507505 A1 | 8/2005 |
| WO | WO2005113429 A1 | 12/2005 |
| WO | WO2006113935 A2 | 10/2006 |
| WO | WO2012152919 A1 | 11/2012 |

OTHER PUBLICATIONS

Wende Xiao and Zhiquan Wu, "Sulfur Dioxide Removal and Recovery," Chemical Industry Press (China), 143-145, May 2001.
Yang Yang, "Sulfur Dioxide Emission Reduction Technology and Flue Gas Desulfurization Project," Metallurgical Industry Press (China), 184-187, Jan. 2004.
Ke Zhang, "Industrial Chemistry," Commercial Press (China), 83-85, Jan. 1958.
Xianxi Ku, "Chemical Technology," Metallurgical Industry Press (China), 37-42, May 1995.
Zhuo Nan and Zengtai Zhao, "Nitrogen Fertilizer Industry," China Industry Press (China) 20-21, Mar. 1964.
Tianqi Liu and Xiaolin Huang, "Three Waste Treatment Engineering Technical Manual (part of Exhaust Gas)," Chemical Industry Press (China), 207-208, May 1999.
Shengli Cao, "Coal Chemical Product Technology," Metallurgical Industry Press (China), 43, Jun. 2003.
Office Action issued in U.S. Appl. No. 14/829,905 dated Nov. 16, 2015.
Office Action issued in U.S. Appl. No. 14/829,905 dated Feb. 29, 2016.
Office Action issued in U.S. Appl. No. 14/829,909 dated Apr. 15, 2016.
Office Action issued in U.S. Appl. No. 14/829,909 dated Dec. 14, 2016.
Office Action issued in U.S. Appl. No. 14/829,909 dated Feb. 14, 2017.
International Search Report issued for International Application No. PCT/CN2013/074657, dated Dec. 26, 2013.
International Search Report issued for International Application No. PCT/CN2014/087887, dated Jan. 14, 2015.
Supplementary European Search Report issued in European Application No. 13882863.7, dated Mar. 11, 2016.
Office Action issued by the Japanese Intellectual Property Office in Japanese Application No. 2017-123088, dated Apr. 16, 2018.
"Introduction to FGD for China Shenhua Coal to Liquid(CTL) Project," Jiangnan Environmental Technology, Inc., 19th Annual Electric Power Conference and Exhibition, Apr. 13, 2017, Chicago, Illinois.
"Advantages & Application of Efficient Ammonia-Based Desulfurization Technology," Jiangnan Environmental Technology, Inc., 19th Annual Electric Power Conference and Exhibition, Apr. 13, 2017, Chicago, Illinois.
Examination Report from Indian Patent Office, dated Feb. 14, 2019.
"Efficient Ammonia-based SRU Tail Gas Desulfurization Process", REFCOMM, Galveston, May 2-6, 2016.

(56) References Cited

OTHER PUBLICATIONS

"Hydrolysis of Urea for Ammonia-Based Wet Flue Gas Desulfurization", (Ind. Eng. Chem. Res., 2015).
Communication from the Chilean Patent Office, dated Apr. 4, 2019.
Google Patents English translation of CN1283346C, 2003.
Google Patents English translation of CN2640585Y, 2004.
Google Patents English translation of CN2772609Y, 2006.
Google Patents English translation of CN100428979C, 2008.
Google Patents English translation of CN201912885U, 2011.
Google Patents English translation of CN10322392A.

* cited by examiner

AMMONIA-BASED DESULFURIZATION PROCESS AND APPARATUS

This application is a continuation of U.S. application Ser. No. 16/357,831, filed on Mar. 19, 2019, which claims benefit of U.S. application Ser. No. 16/188,816, filed on Nov. 13, 2018, which claims the benefit of U.S. application Ser. No. 16/018,386, filed on Jun. 26, 2018, which claims the benefit of U.S. application Ser. No. 15/619,122, filed on Jun. 9, 2017, which claims priority under 35 U.S.C. § 119 of Chinese Patent Application No. 201710379460.3, filed on May 25, 2017, all of which are hereby incorporated herein in their entireties.

TECHNICAL FIELD

This disclosure relates to compositions, methods, and apparatuses for removing sulfur dioxide from exhaust gases. More specifically, this disclosure pertains to the use of separate chambers applying different forms of ammonia to remove sulfur dioxide from exhaust gases.

BACKGROUND

It has long been a desire to remove sulfur dioxide from exhaust gases. One widely used method of removing sulfur dioxide is limestone desulfurization. Unfortunately, limestone desulfurization processes produce massive quantities of unwanted waste water and gypsum slag whose treatment requires onerous investment.

In addition, in the limestone desulfurization process, for every 1 ton of sulfur dioxide removed, about 0.7 ton of carbon dioxide is concurrently produced.

An alternative method of desulfurization is ammonia-based. Ammonia-based desulfurization produces virtually no waste water or waste slag and produces a useful byproduct, ammonium sulfate fertilizer. Thus, it is more economic and environmentally friendly.

Chinese patents CN 1283346C and CN 1321723C disclose a process for removing $SO_2$ from coal-fired flue gas by using ammonia as a removal agent. These patents describe reducing $SO_2$ concentration in the exhaust to levels as low as 100mg/Nm³. The process they describe results in significant amounts of ammonia escaping from the exhaust, sometimes as high as 12 mg/Nm³.

Chinese Patent CN 100428979C discloses an ammonia-based desulfurization process using a multi-section structure, including an oxidation section, a crystallization section, a cooling absorption section, a main absorption section, and a dehydration-demisting section from bottom to top.

Chinese Patent CN 103301705B discloses an apparatus and a process for controlling fine particulate matters in desulfurized flue gas. It includes an absorption liquid demister for removing most of the droplets larger than 10 p.m, a flue gas demister for removing fine particulate matters by rewashing, and a water scrubbing process downstream from the absorption section. It describes achieving no less than 60% removal rate of fine particulate matters.

However, there is still a need for an ammonia-based desulfurization process which achieves adequate desulfurization of exhaust gases while simultaneously inhibiting ammonia escape and aerosol formation.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

For the purposes of this disclosure, like reference numerals in the figures shall refer to like features unless otherwise indicated. The drawings are only exemplifications of the principles of the invention and are not intended to limit the invention to the particular embodiments illustrated.

DETAILED DESCRIPTION

Definitions

Figure 1:
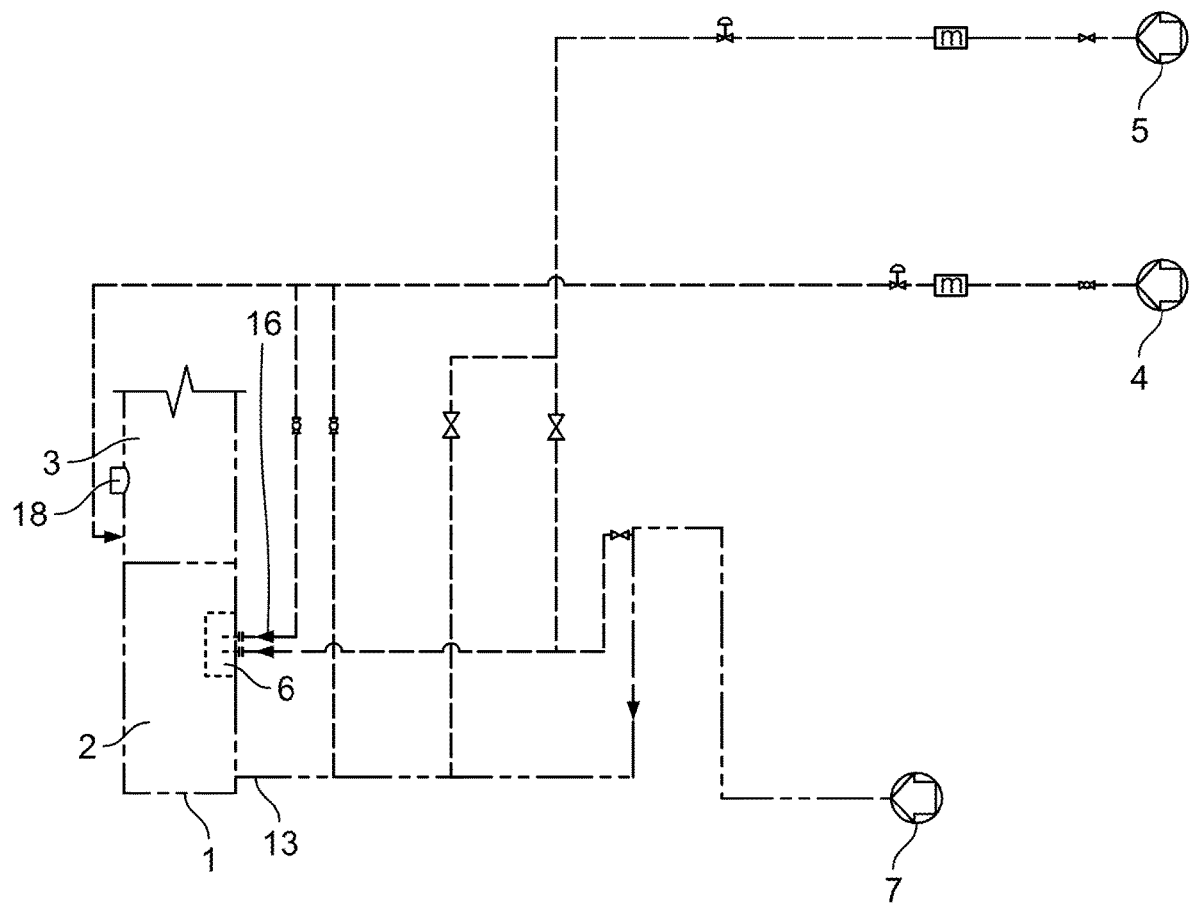
FIG. 1 illustrates a schematic representation of an ammonia-mixing chamber and an oxidation chamber in accordance with the principles of the invention.

"Ammonia-containing liquid" means a liquid including at least one ammonia or amine based compound, including for example, ammonium salts, ammonium ions ($NH4+$), ammonium sulfate, ammonium sulfite, and any combination thereof. The liquid may be water.

"Ammonification" means a chemical treatment utilizing ammonia or an ammonia containing compound, it includes but is not limited to spraying an ammonia bearing liquid into a gas.

"Ammonia-mixing chamber" means a chamber in which an ammonia containing material is prepared, for purposes of this application, the terms "Ammonia-mixing chamber" and "Ammonia-Mixing Chamber" are used herein interchangeably.

"Absorbent" means a first material, such as an ammonia containing material, whose use in a treatment process can remove a targeted material, such as sulfur dioxide, from a second material, such as gas, flue gas, or exhaust gas.

"Dust" means a particulate material fine enough to waft along gaseous flows, when handled, processed, or contacted. It includes but is not limited to aerosols, including solid aerosol particles and liquid aerosol particles, soot, charcoal, non-combusted coal, fine minerals, sand, gravel, salts, and any combination thereof.

"Exhaust" means a flow of gas exiting an industrial or chemical process. It includes but is not limited to flue gas, tail gas, exhaust gases from ovens, furnaces, boilers, and/or generators. It may include combustion products derived from the combustion of air and flammable material, residual material from chemical processes, which may include water, nitrogen, and pollutants, such as particulate matter, soot, carbon monoxide, nitrogen oxides, and sulfur oxides. The exhaust of one process may be a gaseous input to another process.

"Oxidation Rate" means the percentage, calculated by mol percent, of a given material that has been converted into an identified more-oxidized species of the material. For example, in a mixture containing ammonia bearing species and sulfur oxides, if X mol % of the mixture is ammonium sulfate, Y mol % is ammonium sulfite or ammonium bisulfite, and Z mol % is some other ammonia, sulfur, and/or oxygen containing species with an oxidation potential greater than ammonium sulfate, because ammonium sulfate is the identified most-oxidized species, the oxidation rate of the mixture would be X mol %.

In the event that the above definitions or a description stated elsewhere in this application is inconsistent with a meaning (explicit or implicit) that is commonly used, set forth in a dictionary, or stated in a source incorporated by reference into this application, the application and the claim terms in particular are understood to be construed according to the definition or description in this application, and not according to the common definition, dictionary definition, or the definition that was incorporated by reference. In the event that a claim term can only be understood if it is construed by a dictionary, a definition set forth in the Kirk-Othmer Encyclopedia of Chemical Technology, 5th Edition, 2005, (John Wiley& Sons, Inc.) shall control, if provided therein.

Apparatus and methods of ammonia-based oxidative desulfurization are provided.

The apparatus and methods may help meet discharge requirements. Under the conditions that the $SO_2$ concentration in the original flue gas is not more than 30000 mg/Nm$^3$, and the concentration of total particulate matters is not more than 30 mg/Nm$^3$, in the post-treatment clean flue gas, the $SO_2$ content may reach no more than 35 mg/Nm$^3$ and the total dust (including aerosols) content no more than 5 mg/Nm$^3$.

Using the apparatus and methods, the free ammonia content in post-treatment clean flue gas may not be more than 3 mg/Nm$^3$, and the utilization rate of ammonia may reach up to 99% or more. The apparatus and methods may help achieve a high purification efficiency, operate stably and reliably, and reduce secondary pollution.

At least one embodiment is directed toward an apparatus and methods for removing sulfur dioxide from exhaust gas.

The methods may include directing a current of sulfur dioxide containing gas through a vessel. A step of the methods may be mixing, in an ammonia-mixing chamber, a liquid and an ammonia source to produce a first ammonia-containing liquid that has a first pH. Another step of the methods may be contacting, in an oxidation chamber, an oxygen-containing gas with a second ammonia-containing liquid that has a second pH that is lower than the first pH. Another step of the methods may be spraying the first ammonia-containing liquid in the vessel against the current. After spraying the first ammonia-containing liquid, a further step may be recirculating the first ammonia-containing liquid to the ammonia-mixing chamber. Another step of the methods may be spraying the second ammonia-containing liquid in the vessel against the current. After spraying the second ammonia-containing liquid, a further step may be recirculating the second ammonia-containing liquid to the oxidation chamber.

The methods may include a transferring of material (mass transfer) between the oxidation chamber and the ammonia-mixing chamber through a balance hole set in a partition between the oxidation chamber and the ammonia-mixing chamber. A balance hole may provide for mass transfer between two different chambers.

The transferring may occur at a location in a top surface of the ammonia-mixing chamber. The transferring may occur at a location in a lower third of a height of the ammonia-mixing chamber.

The transferring may include transferring through a balance hole that is no more than 0.25 m$^2$. The transferring may include transferring through a balance hole that is no more than 0.1 m$^2$. The transferring may include transferring through a balance hole that is no more than 0.05 m$^2$. The transferring may include transferring through a balance hole that is no more than 0.01 m$^2$. The transferring may include transferring through a balance hole of any suitable size.

The transferring may include transferring through a balance hole that is round. The transferring may include transferring through a balance hole that is rectangular. The transferring may include transferring through a balance hole that is square. The transferring may include transferring through a balance hole that is oval. The transferring may include transferring through a balance hole that is hexagonal. The transferring may include transferring through a balance hole of any suitable shape.

The mixing may include receiving ammonia in the ammonia-mixing chamber, at a material transfer port disposed in a surface of the ammonia-mixing chamber. The material transfer port may be distant from the balance hole. The spraying of the first ammonia-containing liquid may include drawing the first ammonia-containing liquid from the ammonia-mixing chamber. The material transfer port may be in fluid communication with an elongated conduit leading away from the ammonia-mixing chamber.

The mixing may include receiving ammonia in the ammonia-mixing chamber, at a first side of the ammonia-mixing chamber. The spraying of the first ammonia-containing liquid may include drawing the first ammonia-containing liquid from the first side. The transferring of material may include transferring material through a balance hole set in a second side of the ammonia-mixing chamber. The first side may be located away from the second side.

The methods may include, before spraying the first ammonia-containing liquid in the vessel against the current, cooling the current by contacting it with ammonium sulfate slurry. The methods may include, before spraying the first ammonia-containing liquid in the vessel against the current, cooling the current by contacting it with ammonia-containing liquid. The ammonia-containing liquid may include recirculated sprayed ammonia-containing liquid.

When directed into the vessel for treatment by the process, the incoming sulfur dioxide containing gas may have a concentration of sulfur dioxide of more than 28,000 mg/Nm$^3$. The incoming gas may have a concentration of sulfur dioxide of not more than 30,000 mg/Nm$^3$. The incoming sulfur dioxide containing gas directed into the vessel for the treatment may have a total particulate matter concentration of more than 25 mg/Nm$^3$. The incoming gas may have a total particulate matter concentration of not more than 30 mg/Nm$^3$.

The methods may include releasing (exhausting) the gas current from the vessel after the treatment. When released, the exhausted gas may have a concentration of sulfur dioxide of not more than 30 mg/Nm$^3$. The exhausted gas may have a concentration of sulfur dioxide of not more than 35 mg/Nm$^3$. When released, the exhausted gas may have a total dust content (including aerosols) of not more than 5 mg/Nm$^3$.

The methods may include receiving the gas current from a coal combustion process. The methods may include receiving the gas current from a fluidized bed catalytic cracking process.

The ammonia source may include anhydrous ammonia. The ammonia source may include gaseous ammonia. The ammonia source may include aqueous ammonia.

The methods may include, after spraying the first ammonia-containing liquid and the second ammonia-containing liquid, mixing the first and second ammonia-containing liquids to form a mixed reflux liquid.

The methods may include circulating reflux liquid into the ammonia-mixing chamber. The methods may include passing between 30% and 85% of the reflux liquid into the ammonia-mixing chamber.

The methods may include circulating reflux liquid into the oxidation chamber. The methods may include passing between 15% and 70% of the reflux liquid into the oxidation chamber.

The methods may include contacting anhydrous ammonia with the reflux liquid via a microporous distributor and adding the resulting mixture into the ammonia-mixing chamber.

The oxygen-containing gas may include pure molecular oxygen. The oxygen-containing gas may include oxygen-poor air. The oxygen-containing gas may include oxygen-enriched air.

The methods may include, prior to the mixing of the liquid and the ammonia source in the ammonia-mixing chamber, mixing the ammonia source with the oxygen-containing gas.

The oxidation rate of the first ammonia-containing liquid within the ammonia-mixing chamber may be in the range 93% to 99.5%. The oxidation rate of the first ammonia-containing liquid within the ammonia-mixing chamber may be greater than or equal to 98.5%. The oxidation rate of the first ammonia-containing liquid within the ammonia-mixing chamber may be in the range 98.5% to 99.5%.

The oxidation rate of the second ammonia-containing liquid within the oxidation chamber may be greater than or equal to 98.5%. The pH of the second ammonia-containing liquid may be in the range 4.0 to 6.8.

The methods may include, prior to spraying the first ammonia-containing liquid, mixing the ammonia source with the first ammonia-containing liquid.

The methods may include, after the spraying of the first ammonia-containing liquid and the spraying of the second ammonia-containing liquid, mixing the first and second ammonia-containing liquids to form a mixed reflux liquid. Before a subsequent spraying of the first ammonia-containing liquid in the vessel against the current, the methods may include cooling the current by contacting the current with the recirculated sprayed ammonia-containing liquid. Before a subsequent spraying of the second ammonia-containing liquid in the vessel against the current, the methods may include cooling the current by contacting the current with the recirculated sprayed ammonia-containing liquid.

The methods may include releasing the gas current from the vessel, wherein the released gas current may have an entrained ammonia amount of less than or equal to 35 mg/Nm$^3$. When released, the exhausted gas may have an entrained ammonia amount of not more than 3 mg/Nm$^3$.

The methods may include adjusting one or both of the pH of the liquid within the oxidation chamber and the pH of the liquid within the ammonia-mixing chamber by adjusting an opening therebetween. The opening may control a fluid communication between a first conduit carrying the first ammonia-containing liquid and a second conduit carrying the second ammonia-containing liquid. The opening may be adjusted via a sealable valve in the opening.

The methods may include the ammonia-mixing chamber disposed separately from the oxidation chamber. The oxidation chamber and the ammonia-mixing chamber may be in fluid communication via a conduit extending between the oxidation chamber and the ammonia-mixing chamber.

The methods may include the ammonia-mixing chamber disposed within the oxidation chamber. The ammonia-mixing chamber may be disposed at least partly within the oxidation chamber.

The methods may include the spraying the first ammonia-containing liquid in the vessel against the current sequentially before the spraying the second ammonia-containing liquid in the vessel against the current.

The apparatus may include a first sprayer circuit configured to spray a first liquid countercurrent to a gas stream. The apparatus may include a second sprayer circuit configured to spray a second liquid countercurrent to the gas stream.

The first sprayer circuit may include a first sprayer assembly and an ammonia-mixing chamber. The ammonia-mixing chamber may include an ammonia input port. The ammonia-mixing chamber may include a liquid input port. The ammonia-mixing chamber may include a first-liquid return port. The first-liquid return port may be configured to receive the first liquid after the first liquid is sprayed. The ammonia-mixing may include a first-liquid supply port. The first-liquid supply port may be configured to supply the first liquid to the first sprayer assembly.

The second sprayer circuit may include a second sprayer assembly and an oxidation chamber. The second sprayer assembly may be located downstream, relative to the gas stream, from the first sprayer assembly. The oxidation chamber may include a gas input configured for contacting an oxygen-containing gas with an ammonia-containing liquid in the oxidation chamber. The ammonia-containing liquid may be a slurry. The oxidation chamber may include a second-liquid return port. The second-liquid return port may be configured to receive the second liquid after the second liquid is sprayed. The oxidation chamber may include a second-liquid supply port. The second-liquid supply port may be configured to supply the second liquid to the second sprayer assembly.

The ammonia-mixing chamber may define a balance hole. The balance hole may place material from inside the ammonia-mixing chamber in diffusive communication with material from outside the ammonia-mixing chamber. The balance hole may place in diffusive communication a first effluent of the first-liquid return port and a second effluent of the second-liquid return port.

The oxidation chamber may include a spray array in communication with the first-liquid return port and the second-liquid return port.

The apparatus may include a conduit configured to transfer the first liquid from the first-liquid return port to the ammonia-mixing chamber.

The apparatus may include a cooling chamber in which the gas stream is cooled by contacting the gas stream with recirculated sprayed ammonia-containing liquid, before spraying the first liquid countercurrent to the gas stream. An internal volume of the oxidation chamber may partly overlap an internal volume of the cooling chamber.

The apparatus may include a conduit having a first end and a second end. The first end may be configured to be joined to a primary spray absorption section upstream from the first spray assembly. The second end may be bifurcated. The second end may be configured to be joined to the oxidation chamber and to be joined to the ammonia-mixing chamber.

The apparatus may include a gas cap configured to transfer the gas stream from the first sprayer assembly to the second sprayer assembly.

The apparatus may include a sealable valve. The valve may be configured to adjust fluid communication between a first conduit carrying the first liquid from the first-liquid supply port and a second conduit carrying the second liquid from the second-liquid supply port.

The ammonia-mixing chamber may have a volume no less than a volume of the first liquid that is supplied to the first sprayer array over a period of two minutes.

The ammonia-mixing chamber may be disposed at least partly within the oxidation chamber. The ammonia-mixing chamber may be located within the oxidation chamber.

The ammonia-mixing chamber may include a first side and a second side. The ammonia input port may be positioned along the first side. The liquid input port may be positioned along the first side. The second-liquid return port may be positioned along the first side. The balance hole may be positioned along the second side. The balance hole may be at least one balance hole. The balance hole may be one or more than one balance hole.

The ammonia-mixing chamber may include a surface that defines the balance hole. The ammonia-mixing chamber may include a top that defines the balance hole. The balance hole may be disposed in a lower third of a height of the ammonia-mixing chamber.

The balance hole may be no more than 0.25 $m^2$. The balance hole may be no more than 0.1 $m^2$. The balance hole may be no more than 0.05 $m^2$. The balance hole may be no more than 0.01 $m^2$.

The balance hole may be round. The balance hole may be rectangular. The balance hole may be square. The balance hole may be oval. The balance hole may be hexagonal.

The ammonia-mixing chamber may include a material transfer port that is disposed in a surface of the mixing chamber. The material transfer port may be in fluid communication with an elongated conduit leading away from the mixing chamber.

The material transfer port may be distant from the balance hole. The material transfer port may be a distant port. The distant port may be a port closer to the balance hole than any other material transfer port in the mixing chamber. The other material transfer port(s) may be in fluid communication with one or more than one other elongated conduit leading away from the mixing chamber.

The ammonia-mixing chamber may have a first cross-sectional area, the oxidation chamber may have a second cross-sectional area, and the second cross-sectional area may be larger than the first cross-sectional area.

The first cross-sectional area may be about 75% of the second cross-sectional area. The first cross-sectional area may be about 85% of the second cross-sectional area. The first cross-sectional area may be no more than 60% of the second cross-sectional area. The first cross-sectional area may be no more than 50% of the second cross-sectional area. The first cross-sectional area may be no more than 40% of the second cross-sectional area.

The first cross-sectional area may be within the range 8-50% of the second cross-sectional area. The first cross-sectional area may be within the range 8-40% of the second cross-sectional area. The first cross-sectional area may be within the range 10-35% of the second cross-sectional area.

The apparatus may include a conduit configured to transfer the first liquid from the first-liquid return port to the cooling chamber. The apparatus may include a conduit configured to transfer the second liquid from the second-liquid return port to the cooling chamber.

The balance hole may be disposed in a partition between the oxidation chamber and the ammonia-mixing chamber. The oxidation chamber and the ammonia-mixing chamber may be in fluid communication via the balance hole.

A conduit may extend between the oxidation chamber and the ammonia-mixing chamber. The oxidation chamber and the ammonia-mixing chamber may be in fluid communication via the conduit.

The methods may include a process. The process may include a number of steps. A sulfur dioxide-containing gas to be treated is provided. The to be treated gas is fed into an oxidation chamber. Another gas containing oxygen and a reflux liquid are also fed into the oxidation chamber. The oxygen containing gas is bubbled through a liquid phase in the oxidation chamber. Another portion of the reflux liquid and an ammonia absorbent are fed into an ammonia-adding chamber while maintaining a fluid connection between the ammonia-adding chamber and the oxidation chamber. At least one part of a liquid stream taken from the lower portion of the oxidation chamber as a second spray wash liquid is fed into a second spray wash section. At least one part of a liquid stream taken from the lower portion of the oxidation chamber is fed into a subsequent unit to recover ammonium sulfate. The liquid stream taken from the lower portion of the ammonia-adding chamber is fed as the first spray wash liquid into the first spray wash section. The gaseous stream from the oxidation chamber may optionally be separated by the gas-liquid separator. The gaseous stream is fed into a cooled concentration section in which the to be treated gas stream is cooled by being brought into indirect contact with the coolant. The to be treated gaseous stream then passes from the cooled concentration section into the first spray wash section where it undergoes countercurrent contact with the first spray wash liquid. The to be treated gaseous stream then passes to the second spray wash section where it undergoes countercurrent contact with the second spray wash liquid. The liquids from the bottom of the first spray wash section and the bottom of the second spray wash section, are fed either separately or after being mixed together, into one or both ammonia-adding chamber and the oxidation chamber. The now treated gas is emptied out of the second spray wash section.

The sulfur dioxide-containing gas to be treated may be a flue gas produced by coal combustion.

The sulfur dioxide-containing gas to be treated may be a flue gas produced in a fluid catalytic cracking process.

The ammonia absorbent may be in the form of liquid ammonia, gaseous ammonia, ammonia water, or their combination.

The oxygen-containing gas may be oxygen, air, or oxygen-enriched air.

The ammonia absorbent may be added to the liquid stream using a tubular distributor, a microporous distributor, or a static mixer, and the ammonia absorbent may be first mixed with the oxygen-containing air and then the mixed gas stream may be directly added into the ammonia-adding chamber.

The pH of the circulating fluid taken from the lower portion of the ammonia-adding chamber may be in the range 4.6-8.0.

In at least one embodiment of the process, no ammonia absorbent may be added into the oxidation chamber other than the ammonia absorbent from the reflux liquid and ammonia absorbent from the ammonia-adding chamber.

The oxidation rate in the ammonia-adding chamber may be in the range 93% to 99.5%.

The oxidation rate in the oxidation chamber may be no less than 98.5%.

A calculation of the total reflux liquid may be based on the reflux liquid from the first absorption spray section and the second absorption spray section, and 30%-85% of the reflux liquid enters the ammonia-adding chamber while the rest of the reflux liquid enters the oxidation chamber.

A valve may be provided between the pipe to take out the circulating liquid from the lower portion of the oxidation chamber and the pipe to take out of the circulating liquid from the lower question of the ammonia-adding chamber to allow adjustment to the amount of circulating liquid that respectively enters the first spray wash section and the second spray wash section.

The spray liquid from the bottom of the first spray wash section and the second spray wash section may be combined and refluxed, wherein about 60 to about 70% of the reflux liquid may be combined with the ammonia absorbent to enter the ammonia-adding chamber, and the remainder of the reflux liquid may enter the oxidation chamber.

A portion of the ammonia absorbent may enter the portion of the reflux liquid to be fed to the ammonia-adding chamber through the microporous distributor and may be added into the ammonia-adding chamber after it is mixed with the other part of the ammonia absorbent and the oxygen-containing gas.

The ammonia absorbent may be further added to at least one of the cooled concentration section, the first spray wash section, and the second spray wash section.

The condition of the $SO_2$ concentration of the original flue gas may be no more than 30,000 $mg/Nm^3$, the total particulate matter concentration is no more than 30 $mg/Nm^3$, the total particulate matter including aerosol is ≤5 $mg/Nm^3$, and the amount of the entrained ammonia is no more than 3 $mg/Nm^3$.

The apparatus may include an oxidative absorption section, a cooled concentration section, a first spray wash section, and a second spray wash section. The oxidative absorption section may include an oxidation chamber. The oxidation chamber may be configured to allow the contact and reaction of a gaseous stream with a liquid phase. The gaseous stream enters from chamber's bottom, allowing the bubbling of the gaseous stream through the liquid phase in the bottom of the oxidation chamber. After passing through the liquid phase, the gas may undergo a gas-liquid separation process and then enter the upper portion of the cooled concentration section. At least a portion of the liquid phase may be from a liquid stream to be taken from the bottom of a spray wash section. The oxidative absorption section may also include an ammonia-adding chamber. The ammonia-adding chamber may be configured to have a fluid connection with the oxidation chamber. The connection may be located on the top or the sides of the ammonia-adding chamber. The connection allows reflux liquid to enter from its upper portion and allow the removal of a liquid stream from its lower portions. The cooled concentration section may be configured to allow the indirect contact of a gaseous stream that enters the cooled concentration section with a coolant from the oxidation section. The cooled gaseous stream may then enter the first spray wash section. The gas may enter the spray wash section through a partition with a gas cap. The first spray wash section may be configured to allow countercurrent contact between the gaseous stream and sprayed liquid that enters the first spray wash section from its upper portion. After spraying, the spray liquid may be taken out from a lower portion of the first spray wash section to provide reflux liquid. The gaseous stream then passes on to the second spray wash section. The gaseous stream may enter the second spray wash section by passing through a petition with a gas cap. The second spray wash section may be configured to allow countercurrent contact between the gaseous stream and a spray liquid. The spray liquid may enter the second spray wash section from its upper portion. After being sprayed, the spray liquid may provide reflux liquid.

The oxidation chamber may be set up inside an absorption tower. The ammonia-adding chamber may be set up either inside the absorption tower or outside the absorption tower. Alternatively, both the oxidation chamber and the ammonia-adding chamber may be set up inside the absorption tower and may be formed by a section of separation in the lower portion of the absorption tower. The volume of the ammonia-adding chamber may be not less than the amount of the liquid taken out from the lower portion of the oxidation chamber in 2 minutes.

A valve may be provided between the pipe to take out the circulating liquid from the lower portion of the oxidation chamber and the pipe to take out of the circulating liquid from the lower question of the ammonia-adding chamber to allow adjustment of the amount of circulating liquid that respectively enters the first spray wash section and the second spray wash section.

The oxidation chamber and the ammonia-adding chamber may be set up inside an absorption tower and may be formed by a section of separation in the lower portion of the absorption tower.

The maximum cross-sectional area in the absorption tower occupied by the cross-sectional area of the ammonia-adding chamber may be 85%, or no more than 60%, or no more than 50%, or no more than 40%, or in the range 5-50%, or in the range 7-40%, or in the range 10-35%.

The sides and/or top of the ammonia-adding chamber may have an opening.

The ammonia-adding chamber may have one or more balance holes in the lower ⅓ of the side.

The ammonia-adding chamber may have one or more openings in the roof

The area of the opening in the ammonia-adding chamber may be no more than 0.25 $m^2$, or no more than 0.1 $m^2$, or no more than 0.05 $m^2$, or no more than 0.01 $m^2$.

The opening of the ammonia-adding chamber may be round, rectangular, square, oval, or hexagonal.

The balance holes on the sides and/or the top of the ammonia-adding chamber may be located away from all the inlets and outlets of the materials.

The apparatus may include having no spacer between the oxidizing section and the cooled concentration section. There may be a spacer between the oxidizing section and the cooled concentration section that allows the gaseous substance to pass through smoothly.

Embodiments

In the apparatus and methods, an ammonia-based desulfurization process in which the sulfur absorption may occur in different chambers. An oxidation section may include an oxidation chamber and an ammonia-mixing chamber in fluid communication with each other. An ammonia absorbent may be added to the ammonia-mixing chamber. Liquids and gases may be fed or moved between the various chambers and sections via one or more conduits.

In some embodiments, the absorption-oxidation cycle of the ammonia-based desulfurization process may include liquid circulation circuit between the oxidation chamber and a secondary spray absorption section. It also may include a liquid circulation circuit between the ammonia-mixing chamber and a primary spray absorption section. There may be a partial fluid communication between the two circulations circuits. This partial fluid communication may occur via one or more connections between the oxidation chamber and the ammonia-mixing chamber.

In some embodiments, the ammonia-based desulfurization process may include providing a sulfur dioxide-containing gas stream to be treated.

The process may include feeding the sulfur dioxide-containing gas stream to be treated into a cooling concentration section, where the gas stream may be washed and cooled using a circulating washing liquid in the cooling concentration section while concentrating the circulating washing liquid in the cooling concentration section using the heat in the gas stream.

The process may include allowing the gas stream from the cooling concentration section to enter the primary spray absorption section, where the gas stream may be in countercurrent contact with a first spray absorption liquid.

The process may include allowing the gas stream from the primary spray absorption section to enter the secondary spray absorption section, where the gas stream may be in countercurrent contact with a second spray absorption liquid.

The process may include feeding the liquid stream from the bottom of the primary spray absorption section and the liquid stream from the bottom of the secondary spray absorption section as a reflux liquid respectively into the ammonia-mixing chamber and the oxidation chamber, or combining the two streams and then separately feeding the combined liquid stream into the ammonia-mixing chamber and the oxidation chamber.

The process may include feeding an oxygen-containing gas into the oxidation chamber, and feeding an ammonia absorbent into the ammonia-mixing chamber, which is in fluid communication with the oxidation chamber.

The process may include feeding at least part of the liquid stream taken out from the lower part of the oxidation chamber as the second spray absorption liquid into the secondary spray absorption section, and optionally, feeding at least part of the liquid stream taken out from the lower part of the oxidation chamber into a subsequent unit to recover ammonium sulfate.

The process may include feeding the liquid stream taken out from the lower part of the ammonia-mixing chamber as the first spray absorption liquid into the primary spray absorption section.

The process may include venting the gas stream from the upper part of the secondary spray absorption section after removing the droplets.

The process may include further removal of fine particulate matters.

The sulfur dioxide-containing gas to be treated may be any sulfur dioxide-containing gas including those produced in any industrial production process. Examples of the sulfur dioxide-containing gas to be treated may include flue gas produced by coal combustion and flue gas produced in a fluidized-bed catalytic cracking process.

Ammonia may be used as an absorbent to remove sulfur oxides in the gas stream. The ammonia may be in the form of liquid ammonia, gaseous ammonia, aqueous ammonia or any combination of the aforementioned.

The oxygen-containing gas may be, for example, oxygen, air, oxygen-enriched air, oxygen-poor air, or the like.

In the oxidation section, the oxidation chamber and the ammonia-mixing chamber may be in fluid communication with each other.

In some embodiments, the ammonia absorbent is only introduced into the ammonia-mixing chamber. In this way, the oxidation rates and the pH of the materials in the oxidation chamber and the ammonia-mixing chamber can be controlled separately.

The modality of adding the ammonia absorbent is not particularly limited. In some embodiments, the ammonia absorbent may be added directly to the liquid stream using a tubular distributor, a microporous distributor, a static mixer, or the like. The ammonia absorbent may be first mixed with a gas stream, e.g. air, and then the mixed gas stream is added directly to, for example, the ammonia-mixing chamber, or added to the liquid stream, for example, to the liquid stream of the ammonia-mixing chamber, using for example, a tubular distributor, a microporous distributor, a static mixer, or the like. In the case where the ammonia absorbent such as liquid ammonia is mixed with the gas stream, the amount of the gas stream is not particularly limited. The amount is such that the volume ratio of the gaseous ammonia after liquid ammonia gasification to the gas stream may be 1:0.03-1:0.2. The volume ratio of the gaseous ammonia after liquid ammonia gasification to the gas stream may be 1:0.03-1:0.1.

There may be two distinct absorption-oxidation cycles. One may be the liquid stream circulation between the secondary spray absorption section and the oxidation chamber. The other may be the liquid stream circulation between the primary spray absorption section and the ammonia-mixing chamber. There may be some flow between the two circulations. This may be via fluid communication between the oxidation chamber and the ammonia-mixing chamber. In addition, the pipelines transporting circulating spray absorption liquids from the oxidation chamber and the ammonia-mixing chamber may be independent of each other. These pipelines may be in communication with each other via valves between the two. These valves may be arranged to allow adjustment of the amounts and/or pH of the liquids entering the primary spray absorption section and the secondary spray absorption section. In addition, the reflux liquid from the primary spray absorption section and the reflux liquid from the secondary spray absorption section may be fed to the ammonia-mixing chamber and the oxidation chamber respectively, or may be combined, then part of the combined reflux liquid is fed to the ammonia-mixing chamber, and the other part may be fed to the oxidation chamber. In some embodiments, based on the total amount of the reflux liquids from the primary spray absorption section and the secondary spray absorption section, 30% volume-85% volume of the reflux liquid may enter the ammonia-mixing chamber, and the remaining reflux liquid may enter the oxidation chamber.

In some embodiments, the spray liquid from the bottom of the primary spray absorption section and the spray liquid from the bottom of the secondary spray absorption section may be combined and refluxed, wherein about 60% volume to about 70% volume, (e.g. 65% volume), of the combined reflux liquid may enter the ammonia-mixing chamber, where the reflux liquid may be combined with the ammonia absorbent to adjust the pH value, and the remaining part of the combined reflux liquid may enter the oxidation chamber.

In some embodiments, liquid ammonia may be used as the ammonia absorbent, wherein part of the liquid ammonia (e.g. about 55 mol% based on the total ammonia added to the ammonia-mixing chamber). Part of the ammonia may enter the reflux liquid in the ammonia-mixing chamber. The ammonia may enter uniformly, for example by using a microporous distributor or other types of distributors. The other part of the ammonia (e.g. about 45 mol% based on the total ammonia added to the ammonia-mixing chamber) may be mixed with an oxygen-containing gas, e.g. air, and then may be added to the ammonia-mixing chamber. The volume of the oxygen-containing gas, e.g. air, may be about 3% about 10%, e.g. about 5%, of the volume of gaseous ammonia after liquid ammonia gasification.

Mainly by regulating the amount of the ammonia absorbent introduced into the ammonia-mixing chamber and regulating the relative amount of the two adsorption-oxidation cycles, it may be possible to control the pH of the circulating liquids at the outlet of the ammonia-mixing chamber and at the outlet of the oxidation chamber and to control respective oxidation rates in the oxidation chamber and the ammonia-mixing chamber. In some embodiments, the pH of the circulating liquid at the outlet of the ammonia-mixing chamber may be in a range of 4.6-8.0. The pH may be in a range of 5.6-6.4. The oxidation rate in the ammonia-mixing chamber may be in a range of 93%-99.5%. The oxidation rate may be in a range of 97.5%-99%. The pH of the circulating liquid at the outlet of the oxidation chamber may be in a range of 4.0-6.8. The pH of the circulating liquid may be in a range of 4.5-5.9. The oxidation rate in the oxidation chamber may be not less than 98.5%. The oxidation rate may be 98.5%-99.5%.

Optionally, in the apparatus and methods, an ammonia absorbent may also be added in at least one of the oxidation chamber, the cooling concentration section, the primary spray absorption section and the secondary spray absorption section to control the pH of the material in each section. The pH in the cooling concentration section may be controlled in a range of 2.5-5.5. The pH may be controlled in a range of 3-3.5.

Figure 2:
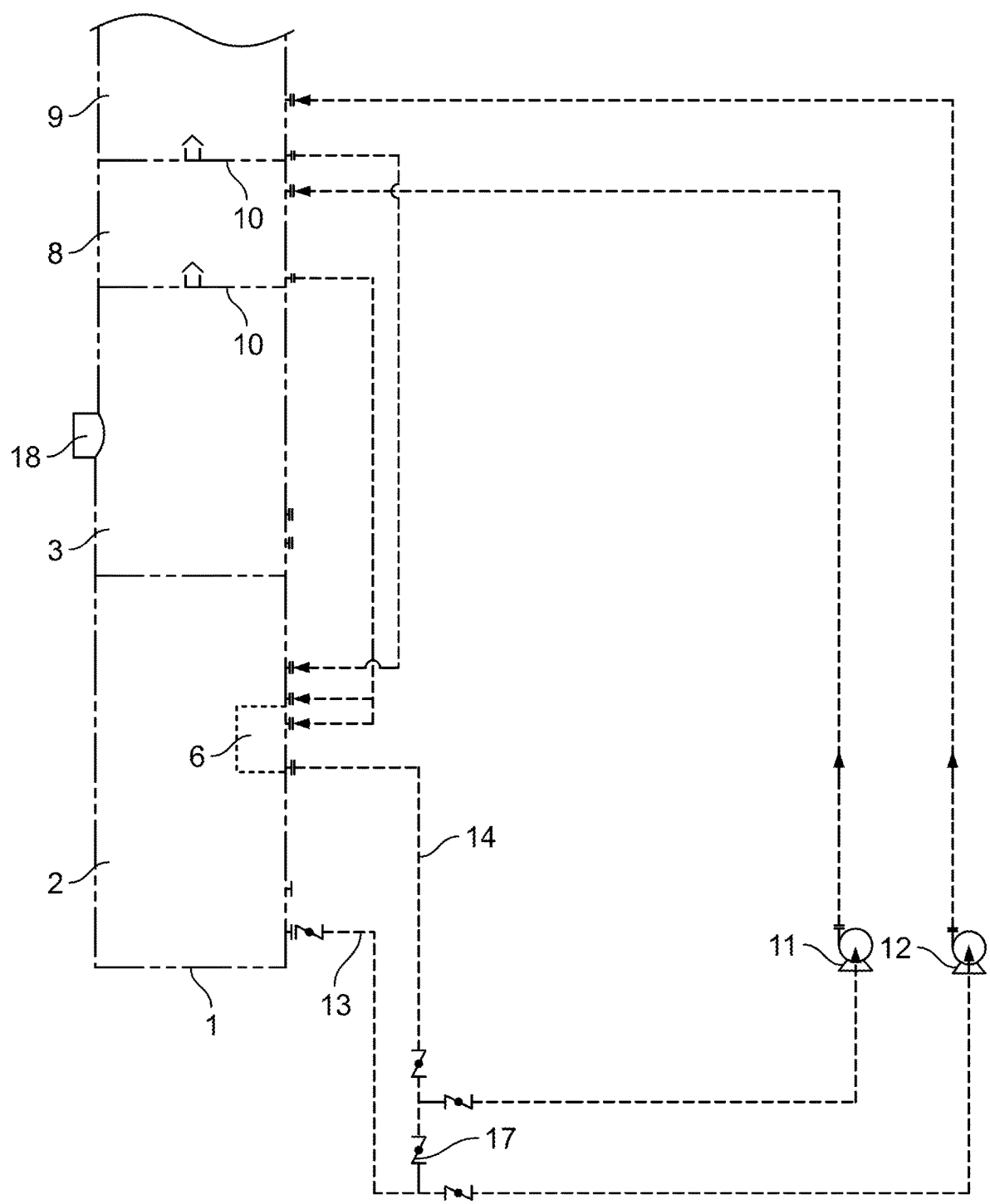
FIG. 2 illustrates a schematic representation of a gas desulfurization apparatus in accordance with the principles of the invention.
Figure 3:
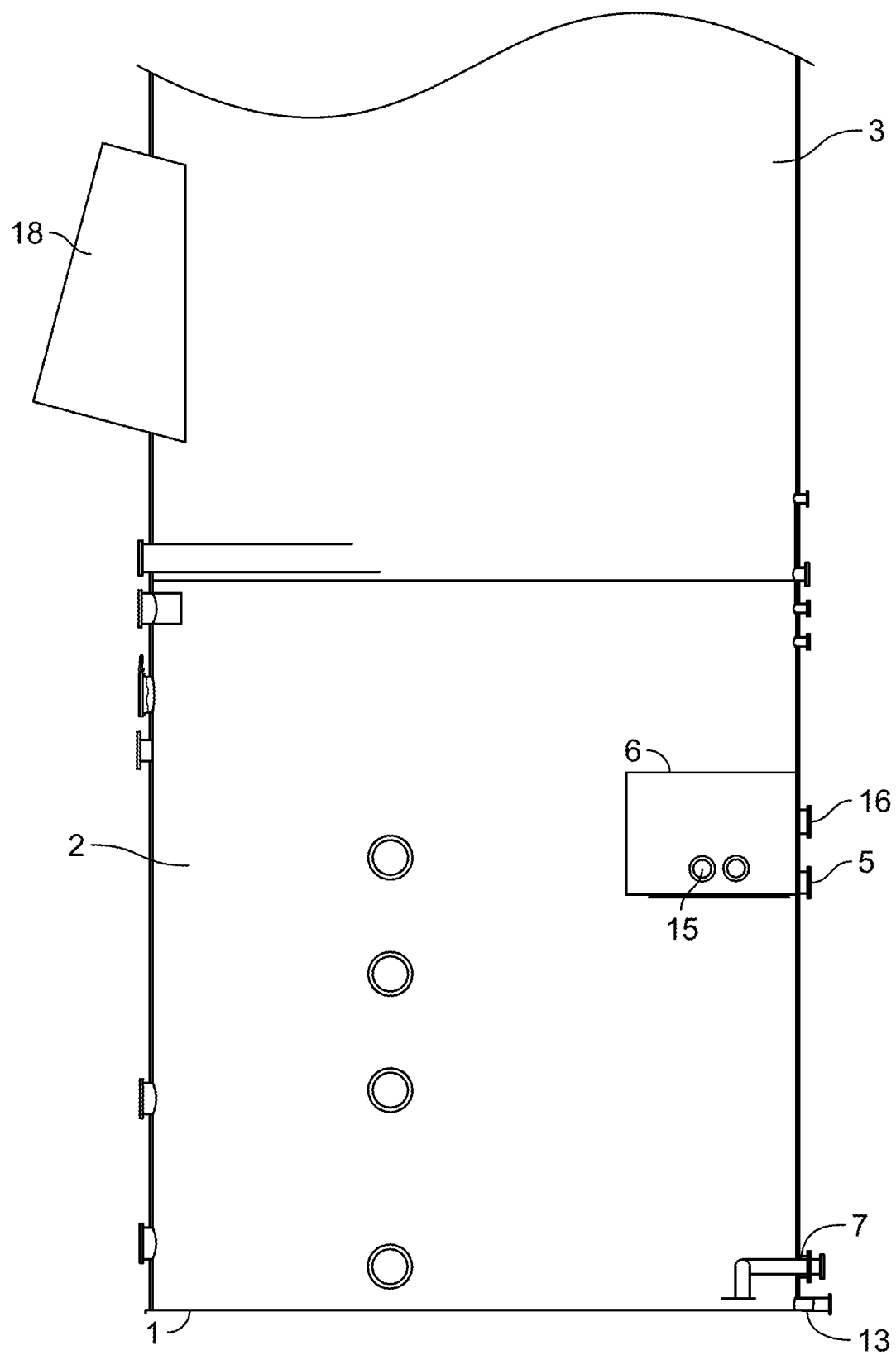
FIG. 3 illustrates a schematic representation of a detailed close-up view of an ammonia-mixing chamber and an oxidation chamber in accordance with the principles of the invention.

FIGS. 1, 2, and 3, illustrate embodiments. A system for treating gas includes an absorption tower 1, an oxidation chamber 2, a cooling concentration section 3, an aqueous ammonia source 4, a liquid ammonia source 5, an ammonia-mixing chamber 6, an air source 7, a primary spray absorption section 8, a secondary spray absorption section 9, a gas cap 10, a primary spray absorption circulating pump 11, and a secondary spray absorption circulating pump 12.

A gas stream to be treated, (including, for example, flue gas such as that produced in coal-fired boilers), may enter a cooling concentration section 3, via entrance 18. Within the cooling concentration section 3, the gas stream may be washed and cooled using a circulating washing liquid in the cooling concentration section while concentrating the circulating washing liquid in the cooling concentration section using the heat in the flue gas. As shown in FIG. 1, an ammonia absorbent 4 (including for example aqueous ammonia) may also be introduced into the gas stream in the cooling concentration section 3. The cooled gas stream may enter (including for example through a gas cap) a primary spray absorption section 8 upward, where the gas stream may be in countercurrent contact with a first spray liquid sprayed from the upper part of the primary spray absorption section 8. This may absorb at least part of the sulfur oxides in the gas stream into the spray liquid and reduces the sulfur oxide content in the gas stream accordingly. The contacted first spray fluid may be collected at the bottom of the primary spray absorption section 8, and may be taken out as the reflux liquid entering an oxidation chamber 2 and an ammonia-mixing chamber 6.

The gas stream primarily absorbed in primary spray absorption section 8 may enter (including for example through a gas cap) a secondary spray absorption section 9 upward, where the gas stream may be in countercurrent contact with a second spray liquid entering through a sprayer from the upper part of secondary spray absorption section 9, so as to further reduce the sulfur oxide content in the gas stream and possibly reduce the amount of entrained ammonia. The contacted second spray fluid is collected at the bottom of secondary spray absorption section 9, and may be taken out as reflux liquid entering oxidation chamber 2 and ammonia-mixing chamber 6. The gas stream further treated in secondary spray absorption section 9 may be vented after removing the droplets, or vented after further treatment through a subsequent optional section for removal of fine particulate matters.

The reflux liquid from secondary spray absorption section 9 or part of the combined reflux liquid from primary spray absorption section 8 and secondary spray absorption section 9 may enter oxidation chamber 2, and may be mixed with an oxygen-containing gas, (including for example air 7), therein, so that at least part of ammonium sulfite or ammonium bisulfite in the reflux liquid may be oxidized to ammonium sulfate. Part of the liquid phase in the lower part of oxidation chamber 2 may be taken out through pipeline or conduit 13. At least part of the liquid stream taken out may be fed to the upper part of secondary spray absorption section 9 via a circulating pump 12 as the spray absorption liquid, and optionally, at least part of the liquid stream taken out may be fed to a downstream unit for treatment to recover ammonium sulfate.

Ammonia-mixing chamber 6 may be in fluid communication with oxidation chamber 2 through openings 15 in the upper part and side thereof, allowing material exchange between the two chambers. At least part of the reflux liquid from the bottom of primary spray absorption section 8 or at least part of the combined reflux liquid from a port at the bottom of primary spray absorption section 8 and the bottom of secondary spray absorption section 9 may enter ammonia-mixing chamber 6 from the upper part 16, and may be combined with an ammonia absorbent 5 (e.g. liquid ammonia) (including for example via a microporous distributor). The rest of the ammonia absorbent 5 (including for example liquid ammonia) may be mixed with air 7 and may be added to the ammonia-mixing chamber 6. Part of the liquid may be taken out from a port at the lower part of the ammonia-mixing chamber 6 through pipeline or conduit 14, and may be fed to a port at the upper part of primary spray absorption section 8 through circulating pump 11 as the spray absorption liquid.

Communication channel 17 may be provided between pipelines 13 and 14, and may allow adjustment of the amounts and pH values of the spray liquids entering primary spray absorption section 8 and secondary spray absorption section 9. In some embodiments, an ammonia absorbent is introduced into ammonia-mixing chamber 6. In some embodiments, an ammonia absorbent is introduced in cooling concentration section 3. In some embodiments, an ammonia absorbent is introduced in one or more of primary spray absorption section 8, the secondary spray absorption section 9, and a section for removing fine particulate matters. Different introduction site for the ammonia absorbent facilitates better regulation and control over the composition and pH of the various liquid streams.

In some embodiments, the ammonia-based desulfurization apparatus may include primary spray absorption section 8. Primary spray absorption section 8 may be configured to allow countercurrent contact between a first spray liquid sprayed from the upper part thereof and a gas stream entering from below. Primary spray absorption section 8 may also be configured for removal of the contacted first spray liquid from the lower part thereof to provide a reflux liquid. Primary spray absorption section 8 may also be configured to pass the preliminarily absorbed gas stream to secondary spray absorption section 9, for example, through a partition with a gas cap.

In some embodiments, the ammonia-based desulfurization apparatus may include secondary spray absorption section 9. Secondary spray absorption section 9 may be configured to allow countercurrent contact between a second spray liquid sprayed from the upper part thereof and a gas stream entering from primary spray absorption section 8. Secondary spray absorption section 9 may also be configured for removal of the contacted second spray liquid from the lower part thereof to provide a reflux liquid.

In some embodiments, the ammonia-based desulfurization apparatus may include an oxidation section 2. Oxidation section 2 may include an oxidation chamber which may be configured to allow contact and reaction between oxygen-containing gas 7 and at least part of the reflux liquid from secondary spray absorption section 9 or part of the combined reflux liquid from primary spray absorption section 8 mixed with liquid from secondary spray absorption section 9. Oxidation section 2 may also be configured for removal of liquid phase from the lower part thereof for circulation in secondary spray absorption section 9 or both secondary spray absorption section 9 and primary spray absorption section 8.

In some embodiments, the ammonia-based desulfurization apparatus may include ammonia-mixing chamber 6. Ammonia-mixing chamber 6 may be configured to be in fluid communication with oxidation chamber 2 via openings on its top and/or side. Ammonia-mixing chamber 6 may be configured to allow at least part of the reflux liquid from primary spray absorption section 8 or part of the combined reflux liquid from the primary and secondary spray absorption sections 8, 9 to enter from the upper part thereof and mix with an ammonia absorbent. Ammonia-mixing chamber 6 may be configured for removal of a liquid stream from the lower part thereof for circulation in the primary spray absorption section 8 or both the secondary and primary spray absorption sections 8, 9.

In some embodiments, the ammonia-based desulfurization apparatus may include cooling concentration section 3. Cooling concentration section 3 may be upstream of primary spray absorption section 8. Cooling concentration section 3 may be configured to allow a gas stream to be treated, (including for example flue gas produced in coal-fired boilers), to be washed and cooled by a circulating washing liquid in the cooling concentration section while concentrating circulating washing liquid in the cooling concentration section using the heat in the gas stream. Cooling concentration section 3 may be also be configured to allow the cooled gas stream to enter the primary spray absorption section 8. The gas may enter primary spray absorption section 8 by passing through a partition with a gas cap.

In some embodiments, each section of the apparatus may be positioned within an absorption tower. When so positioned, the volume of the oxidation chamber may be determined based on the residence time required for oxidation. In some embodiments, the volume of the ammonia-mixing chamber is generally not less than the volume of fluid which passes through circulation pumps like 11 or 12 over a period of two minutes.

In some embodiments, oxidation chamber 2 and ammonia-mixing chamber 6 in the oxidation section may be provided separately. For example, the oxidation chamber and the ammonia-mixing chamber may be provided by two tanks in fluid communication with each other. As another example, the oxidation chamber may be provided in an absorption tower accommodating each section of the apparatus, and the ammonia-mixing chamber may be provided in the absorption tower or outside the absorption tower.

In some embodiments, the oxidation chamber and the ammonia-mixing chamber in the oxidation section may be formed by one or more than one partition using a tank(s). Both the oxidation chamber and the ammonia-mixing chamber in the oxidation section may be provided in an absorption tower accommodating each section of the apparatus, and may be formed by a partition in the lower part of the absorption tower. In such an embodiment, the cross-sectional area of the ammonia-mixing chamber at most may account for 85% (e.g. no more than 60%, or no more than 50%, or no more than 40%, or is in a range of 8%-50%, or is in a range of 10%-40%, or is in a range of 12%-35%) of the cross-sectional area of the tank/absorption tower.

The ammonia-mixing chamber may be provided below the control level of the oxidation chamber. For example, the top of the ammonia-mixing chamber may be at least 20 cm below the control level of the oxidation chamber. The top of the ammonia-mixing chamber may be 100-200 cm below the control level of the oxidation chamber.

In some embodiments, there may be no openings on the bottom surface of the ammonia-mixing chamber.

In some embodiments, one or more balance holes in fluid communication with the oxidation chamber may be opened on the side of the ammonia-mixing chamber. The balance hole(s) may be opened in the lower part of the side, e.g. in the ⅛ lower part, or in the ⅙ lower part, or in the ⅕ lower part, or in the ¼ lower part, or in the ⅓ lower part of the side. The area of each opening may be not more than 0.25 m². The area may be not more than 0.1 m². The area may be not more than 0.05 m². The area may be not more than 0.01 m². The shape of the opening is not particularly limited. For example, the opening may be a round, a rectangle, a square, an oval, a hexagon, or the like. In a specific embodiment, the opening may be a square of 80×80 mm or 90×90 mm or 100×100 mm. In another specific embodiment, the opening may be round with a diameter of 80, or 85, or 90, or 95, or 100, or 110 mm.

The number of the openings on the side can be calculated according to the cross-sectional area required to at least reach the flow of a single circulating pump and the area of a single opening at a flow rate of 4 m/s. In general, the number of the openings on the side enables the total area of the openings to be equal to or larger than the cross-sectional area required to reach the flow of a single circulating pump at a flow rate of 4 m/s.

There may also be one or more openings on the roof of the ammonia-mixing chamber. In general, the number of the openings on the roof may be 1-3 times as much as the number of the openings on the side, and the size of the openings on the roof may be the same as or different from the size of the openings on the side. The shape of the openings on the roof may be the same as or different from the shape of the openings on the side. The balance holes on the side and top of the ammonia-mixing chamber should be generally provided away from the inlet and outlet of each material. In some embodiments, FIG. 3 schematically describes the arrangement of openings of an ammonia-mixing chamber. The arrangement of the openings on the side and/or top of the ammonia-mixing chamber allows series flow between the two circulations.

The shape of the ammonia-mixing may be determined according to its location and the relative ease of assembling, accessing, operating, and maintaining the equipment. For example, in the case where the ammonia chamber is connected to the tower or tank wall, it may be semi-cylindrical; in the case where the ammonia chamber may be placed in the middle of the tower, it may be processed into a horizontal tank; and in the case where the ammonia chamber is placed outside the tower, it may be manufactured as a cylindrical vertical tank.

In some embodiments, as shown in FIGS. 1-3, the cross sectional area of the ammonia-mixing chamber 6 may be about 15% (about 30%, e.g. 18%, 20%, 22% or 25%) of the cross sectional area of absorption tower 1. The height of ammonia-mixing chamber 6 may be about 30 (about 42%, e.g. 35%, 38% or 40%) of the height of the oxidation section. The overall ammonia-mixing chamber 6 may be below the control level within oxidation chamber 2 (e.g. at least about 50 cm below the control level, e.g. 60 cm, 80 cm, 100 cm or 150 cm below the control level). The volume of ammonia-mixing chamber 6 may be about 15-40 m$^3$ (e.g. 18, 22 or 26 m$^3$).

The volume of oxidation chamber 2 may be about 150-400 m$^3$ (e.g. 180, 220 or 260m$^3$). The volume ratio of ammonia-mixing chamber 6 to oxidation chamber 2 may be about 1:10. Ammonia-mixing chamber 6 may have between 5 to 15 balance holes 15 in the lower part of the side (e.g. in the ¼ or ⅕ or ⅙ of the lower part). Ammonia- mixing chamber 6 may have between 10-30 (e.g. 20) balance holes 15 on the roof. The size of each hole may be 80×80 mm. The balance holes are located away from the inlet of the reflux liquid and ammonia intake.

The reflux liquid from primary spray absorption section 8 and the reflux liquid from secondary spray absorption section 9 may be combined. 60-70% of the volume (e.g. 65% volume) of the total reflux liquid may enter ammonia-mixing chamber 6 and may be mixed with liquid ammonia 5. The remaining portion of the reflux liquid may enter oxidation chamber 2. Based on the total amount of liquid ammonia fed to ammonia-mixing chamber 6, for example, about 55% of liquid ammonia 5 may be added directly to ammonia-mixing chamber 6 (including for example through a microporous distributor). The remaining 45% of liquid ammonia 5 may be mixed with air 7 and then fed to ammonia-mixing chamber 6. The volume of air 7 may be about 5%-10% of the volume of gaseous ammonia present after liquid ammonia gasification. Valves may be set on each pipeline or conduit from/to oxidation chamber 2 and ammonia-mixing chamber 6 as appropriate, so as to allow adjustment of the flows of materials from/to the two chambers, and to allow adjustment of the compositions of the liquid streams from/to the two chambers.

EXAMPLES

Example 1

An ammonia-based desulfurization of the flue gas from a coal combustion process was carried out with an embodiment of the apparatus and methods, such as that illustrated in FIGS. 1-3, except that an oxidation chamber and an ammonia-mixing chamber were provided by two tanks outside an absorption tower. The apparatus included a DN500 communication pipe located in the middle part of the two tanks. A first liquid was circulated from an outlet in a lower part of the ammonia-mixing chamber into an upper part of a primary spray absorption section. A second circulating liquid flowed from an outlet in a lower part of the oxidation chamber into an upper part of a secondary spray absorption section. A first reflux liquid was formed from the primary spray absorption section and a second reflux liquid was formed from the secondary spray absorption section. The first and second reflux liquids converged at a gas-liquid separator between a cooling concentration section and the primary spray absorption section to form a mixed reflux liquid. The rate of liquid flow was 2700 m$^3$/h, wherein 60% volume of the reflux liquid entered the ammonia-mixing chamber, and 40% volume of the mixed reflux liquid entered the oxidation chamber. Liquid ammonia was added to the ammonia-mixing chamber uniformly and gently at a flow rate of 204 kg/h through a microporous distributor. The remaining liquid ammonia was added to air at a rate of 300 kg/h through a distributor. The air volume was 10% of the volume of gaseous ammonia after liquid ammonia gasification. The mixed gas was fed to the ammonia-mixing chamber. The volume of the ammonia-mixing chamber was 27 m$^3$; the volume of the oxidation chamber was 200 m$^3$. No stream was fed to downstream units to recover ammonium sulfate.

The flow rate of the original flue gas was 600,000 Nm$^3$/h, its temperature was 145° C., its SO$_2$ concentration was 1600 mg/Nm$^3$, and the concentration of total particulate matter was 21.3 mg/Nm$^3$. The pH of the circulating liquid at the outlet in the lower part of the ammonia-mixing chamber was 6.1, and the oxidation rate in the ammonia-mixing chamber was 98%. The pH of the circulating liquid at the outlet in the lower part of the oxidation chamber was 5.3, and the oxidation rate in the oxidation chamber was 99.5%. The gas temperature at the outlet of the cooling concentration section was 51.4° C.

After undergoing the ammonia-based desulfurization process, the SO$_2$ content in the resulting cleaned flue gas from the secondary spray absorption section was 17.3 mg/Nm$^3$, the content of total particulate matters (including aerosols) was 1.8 mg/Nm$^3$, and the amount of entrained ammonia was 0.35mg/Nm$^3$.

Example 2

The procedure of Example 1 was repeated, except that the oxidation chamber and the ammonia-mixing chamber were provided within a common tank with a diameter of 5.5 m, the cross-sectional area of the ammonia-mixing chamber was 18% of the cross-sectional area of the tank, and the top of the ammonia-mixing chamber was 1 m lower than the liquid level in the oxidation chamber. 13 balance holes were disposed in a lower part on the side of the ammonia-mixing chamber, 22 balance holes were disposed on the roof. The size of each hole was 80×80 mm. The balance holes were provided away from the outlet of the circulating liquid and away from the ammonia intake. The volume of the ammonia-mixing chamber, with a semi-cylindrical shape, was 27 m$^3$. The volume of the oxidation chamber was 220 m$^3$. A first spray liquid from the primary spray absorption section and a second spray liquid from the secondary spray absorption section were combined into a reflux liquid. 70% of this combined reflux liquid was combined with 20% aqueous ammonia at a rate of 2522 kg/h and then entered the ammonia-mixing chamber, while the remaining reflux liquid entered the oxidation chamber.

The pH of the circulating liquid taken out from the ammonia-mixing chamber was 6.3, and the oxidation rate in the ammonia-mixing chamber was 98.6%. The pH of the circulating liquid taken out from the oxidation chamber was 5.4, and the oxidation rate in the oxidation chamber was 99.7%.

After undergoing the ammonia-based desulfurization process, the SO$_2$ content in the cleaned flue gas was 16.3 mg/Nm³, the content of total particulate matters (including aerosols) was 2.1 mg/Nm³ and the amount of entrained ammonia was 0.42 mg/Nm³.

Example 3

The procedure was carried out using the apparatus of Example 1, except that the oxidation chamber and the ammonia-mixing chamber were provided in a common tank with a diameter of 6 m. The cross-sectional area of the ammonia-mixing chamber was 20% of the cross-sectional area of the tank. The top of the ammonia-mixing chamber was 1.5 m lower than the liquid level in the oxidation chamber. Eight balance holes were disposed in the lower part on the side of the ammonia-mixing chamber. Thirteen balance holes were disposed on the roof, the size of each single hole was 100×100 mm. The balance holes were provided away from the outlet of the circulating liquid and away from the ammonia intake. The volume of the ammonia-mixing chamber was 25 m³. The ammonia-mixing chamber was located in the middle of the tank, and was disposed horizontally in the tank. The volume of the oxidation chamber was 228 m³. The first spray liquid from the primary spray absorption section and the second spray liquid from the secondary spray absorption section were not combined. Instead, the two spray liquids were fed to the ammonia-mixing chamber and the oxidation chamber respectively. The flow rate of the sprayed liquid back to the ammonia-mixing chamber was 1700 m³/h. The flow rate of the second sprayed liquid back to the oxidation chamber was 600 m³/h. 20% aqueous ammonia used as an absorbent was added to the sprayed liquid entering the ammonia-mixing chamber at a flow rate of 5432 kg/h, and was added to the sprayed liquid entering the oxidation chamber at a flow rate of 1316 kg/h.

The flow rate of the original flue gas was 300000 Nm³/h, its temperature was 145° C., the $SO_2$ concentration was 8500 mg/Nm³, and the concentration of total particulate matters was 28.5 mg/Nm³.

The pH of the circulating liquid taken out from the ammonia-mixing chamber was 6.5, and the oxidation rate in the ammonia-mixing chamber was 96.8%. The pH of the circulating liquid taken out from the oxidation chamber was 5.3, and the oxidation rate in the oxidation chamber was 99%.

After undergoing the ammonia-based desulfurization process, the $SO_2$ content in the cleaned flue gas was 31.4 mg/Nm³, the content of total particulate matters (including aerosols) was 2.8 mg/Nm³, and the amount of entrained ammonia was 0.7 mg/Nm³.

Example 4

The experiment of Example 3 was repeated, except that ammonification in different chambers was not employed. Instead the ammonia-mixing chamber and the oxidation chamber were combined into one. The first spray liquid from the primary spray absorption section and the second spray liquid from the secondary spray absorption section were combined at a rate of 2300 m³/h and then entered the oxidation chamber, before which 20% aqueous ammonia was added at a rate of 6770 kg/h. After oxidation, the spray liquids returned to the primary and secondary spray absorption sections for absorption. The pH of the oxidized circulating liquid was 5.9 and the oxidation rate was 98.3%.

After passing through the apparatus, the $SO_2$ content was 67 mg/Nm³, the content of total particulate matters (including aerosols) was 12 mg/Nm³, the amount of entrained ammonia was 2.7 mg/Nm³, and consumption of 20% aqueous ammonia was increased by 22 kg/h compared to the consumption that occurred in Example 3. These results indicate inferior performance compared to that achieved by Example 3.

The detection methods of some indicators and main instruments in the examples are shown in Table 1 below

TABLE 1

Detection methods of some indexes and main instruments

| S/N | Monitoring items | Standard names and numbers of analysis methods | Instrument names and models | Instrument Nos. |
|---|---|---|---|---|
| 1 | Flue dust | Determination of particulates and sampling methods of gaseous pollutants emitted from exhaust gas of stationary source (Chinese Environmental Standard GB/T16157-1996) | Laoying 3012H flue dust sampler Electronic balances BS224S and AB204-S | 8042448, 08244496 18360886 and 1119051201 |
| 2 | $SO_2$ | Determination of sulphur dioxide from exhausted gas of stationary source Fixed-potential electrolysis (Chinese Environmental Standard HJ/T 57-2000) | Testo 350 flue gas analyzer | 10# and 1# |
| 4 | Ammonia | Air and exhaust gas-Determination of ammonia-Nessler's reagent spectrophotometry (Chinese Environmental Standard HJ 533-2009) | Laoying 3072H 722 spectro-photometer | 02085809 and 2c5BP363 |
| 5 | Flue gas oxygen content | Specification and test procedures for continuous emission monitoring systems of flue gas emitted from stationary sources-Electrochemical process (Appendix B) (Chinese Environmental Standard HJ/T 76-2007) | Testo 350 flue gas analyzer | 10# and 1# |
| 6 | Flue gas temperature | Determination of particulates and sampling methods of gaseous pollutants emitted from exhaust gas of stationary source-Platinum resistance method (Chinese Environmental Standard GB/T16157-1996) | TES-1310 | — |
| 7 | Flue gas humidity | Specification and test procedures for continuous emission monitoring systems of flue gas emitted from stationary sources (Appendix B) (Chinese Environmental Standard HJ/T 76-2007) | Laoying 3012H flue dust sampler | 8042448 and 08244496 |

The present disclosure illustrates principles of the invention and is not intended to limit the invention to the particular embodiments illustrated. All patents, patent applications, scientific papers, and any other referenced materials mentioned herein are incorporated by reference in their entirety. The principles of the invention encompass any possible combination of some or all of the various embodiments mentioned herein, described herein and/or incorporated herein. The principles of the invention encompass any possible combination that also specifically excludes any one or some of the various embodiments mentioned herein, described herein and/or incorporated herein.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g. 2.3 to 9.4, 3 to 8, 4 to 7), and to each number 1, 2, 3, 4, 5, 6, 7, 8, 9, and 10 contained within the range. All percentages, ratios and proportions herein are by weight unless otherwise specified.

Thus, apparatus and methods for using ammonia to remove sulfur dioxide from exhaust gases have been provided. Persons skilled in the art will appreciate that the present invention can be practiced by other than the described embodiments, which are presented for purposes of illustration rather than of limitation. The present invention is limited only by the claims that follow.

What is claimed is:

1. A method of ammonia-based oxidative desulfurization comprising;
   directing a current of sulfur dioxide containing gas through a vessel;
   mixing, in an ammonia-mixing chamber, a liquid and an ammonia source to produce a first ammonia-containing liquid that has a first pH;
   contacting, in an oxidation chamber, an oxygen-containing gas with a second ammonia-containing liquid that has a second pH that is lower than the first pH;
   spraying, via a first sprayer assembly, the first ammonia-containing liquid in the vessel against the current;
   after the spraying the first ammonia-containing liquid, recirculating the first ammonia-containing liquid to the ammonia-mixing chamber;
   spraying via a second sprayer assembly, the second ammonia-containing liquid in the vessel against the current;
   after the spraying the second ammonia-containing liquid, recirculating the second ammonia-containing liquid to the oxidation chamber; and
   fluidically communicating the ammonia-mixing chamber and the oxidation chamber with a primary absorption section of the vessel upstream from the first sprayer assembly via a conduit having a first end and a second end, the first end configured to be joined to the primary spray absorption section, the second being bifurcated and configured to be joined to:
   the oxidation chamber; and
   the ammonia-mixing chamber.

2. The method of claim 1 further comprising, before the spraying the first ammonia-containing liquid in the vessel against the current, cooling the current by contacting it with recirculated sprayed ammonia-containing liquid.

3. The method of claim 1 further comprising, before the spraying the first ammonia-containing liquid in the vessel against the current, cooling the current by contacting the current with ammonium sulfate slurry.

4. The method of claim 1 further comprising releasing the gas current from the vessel;
   wherein:
   in the directing, the sulfur dioxide containing gas has:
   an $SO_2$ concentration not more than 30000 mg/$Nm^3$; and
   a total particulate matter concentration not more than 30 mg/$Nm^3$; and
   the releasing includes:
   releasing an exhaust gas having an $SO_2$ concentration no more than 35 mg/$Nm^3$; and
   a total dust, including aerosols, content no more than 5 mg/$Nm^3$.

5. The method of claim 1 further comprising receiving the gas current from a coal combustion process.

6. The method of claim 1 further comprising receiving the gas current from a fluid catalytic cracking process.

7. The method of claim 1 wherein the ammonia source comprises anhydrous ammonia.

8. The method of claim 1 wherein the ammonia source comprises gaseous ammonia.

9. The method of claim 1 wherein the ammonia source comprises aqueous ammonia.

10. The method of claim 1 further comprising, after the spraying, the first and second ammonia-containing liquids, mixing the first and second ammonia-containing liquids to form a mixed reflux liquid.

11. The method of claim 10 further comprising circulating the reflux liquid into the oxidation chamber.

12. The method of claim 10 further comprising passing between 30% and 85% of the reflux liquid into the ammonia-mixing chamber.

13. The method of claim 10 further comprising circulating between 70% and 15% of the reflux liquid into the oxidation chamber.

14. The method of claim 10 further comprising contacting anhydrous ammonia with the reflux liquid via a microporous distributor and adding the resulting mixture into the ammonia-mixing chamber.

15. The method of claim 1 wherein the oxygen-containing gas is pure molecular oxygen.

16. The method of claim 1 wherein the oxygen-containing gas is oxygen-poor air.

17. The method of claim 1 wherein the oxygen-containing gas is oxygen-enriched air.

18. The method of claim 1 further comprising, prior to the mixing of the liquid and the ammonia source, mixing the ammonia source with the oxygen-containing gas.

19. The method of claim 1 wherein the pH of the second ammonia-containing liquid is in the range 4.0 to 6.8.

20. The method of claim 1 further comprising releasing the gas current from the vessel, wherein the released gas current has an entrained ammonia amount no more than 3 mg/$Nm^3$.

21. The method of claim 1 wherein the ammonia-mixing chamber is disposed separately from the oxidation chamber.

22. The method of claim 1 wherein the ammonia-mixing chamber is disposed at least partly within the oxidation chamber.

23. The method of claim 1 wherein the spraying the first ammonia-containing liquid in the vessel against the current occurs before the spraying the second ammonia-containing liquid in the vessel against the current.

24. An apparatus for removing sulfur from a gas stream, the apparatus comprising:
   a first sprayer circuit configured to spray a first liquid countercurrent to the gas stream, the first sprayer circuit including:
   a first sprayer assembly; and
   an ammonia-mixing chamber including:
   an ammonia input port;
   a first-liquid return port configured to receive first liquid after the first liquid is sprayed; and a first-liquid supply port configured to supply first liquid to the first sprayer assembly, the ammonia-mixing chamber defining a balance hole that places material from inside the ammonia-mixing box in diffusive communication with material from outside of the ammonia-mixing box; and a second sprayer circuit configured to spray a second liquid countercurrent to the gas stream, the second sprayer circuit including:
a second sprayer assembly downstream, relative to the gas stream, from the first sprayer assembly; and
an oxidation chamber having:
a gas input configured for contacting an oxygen-containing gas with an ammonia-containing liquid in the oxidation chamber;
a second-liquid return port configured to receive second liquid after the second liquid is sprayed; and
a second-liquid supply port configured to supply second liquid to the second sprayer assembly;

wherein, after the first and second liquids are sprayed, the first and second liquids are mixed to form a mixed reflux liquid.

25. The apparatus of claim 24 further comprising a cooling chamber in which the gas stream is cooled, before spraying the first liquid countercurrent to the gas stream, by contacting the gas stream with recirculated sprayed ammonia-containing liquid.

26. The apparatus of claim 24 further comprising a gas cap configured to transfer the gas stream from the first sprayer assembly to the second sprayer assembly.

27. The apparatus of claim 24 further comprising a sealable valve configured to adjust fluid communication between a first conduit carrying the first liquid from the first-liquid supply port and a second conduit carrying the second liquid from the second-liquid supply port.

28. The apparatus of claim 24 wherein the ammonia-mixing chamber has a volume no less than a volume of the first liquid that is supplied to a first sprayer array over a period of two minutes.

29. The apparatus of claim 24 wherein the ammonia-mixing chamber is disposed at least partly within the oxidation chamber.

30. The apparatus of claim 24 wherein:
the ammonia-mixing chamber has a first cross-sectional area;
the oxidation chamber has a second cross-sectional area; and
the second cross-sectional area is larger than the first cross-sectional area.

\* \* \* \* \*